Sept. 24, 1963 A. J. TAYLOR 3,104,653

HEAT EXCHANGER CONSTRUCTION

Filed June 18, 1959 4 Sheets-Sheet 1

*Inventor*
Anthony J. Taylor
By [signature]
*Attorney*

Sept. 24, 1963 A. J. TAYLOR 3,104,653

HEAT EXCHANGER CONSTRUCTION

Filed June 18, 1959 4 Sheets-Sheet 2

Inventor
Anthony J. Taylor
By [signature]
Attorney

HEAT EXCHANGER CONSTRUCTION
Filed June 18, 1959
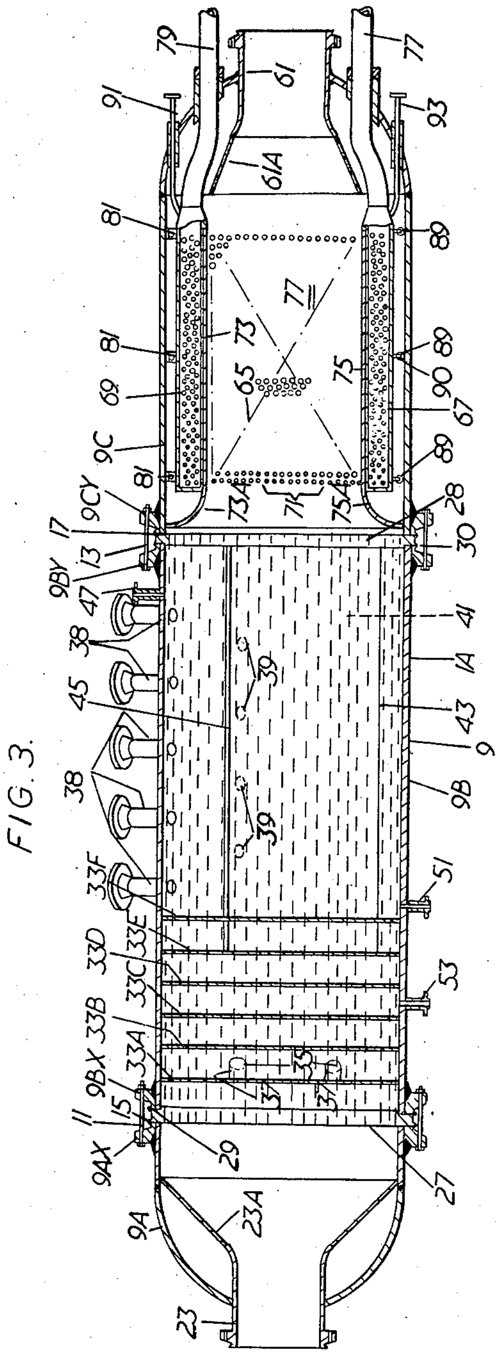
Inventor
Anthony J. Taylor
By [signature]
Attorney Sept. 24, 1963 A. J. TAYLOR 3,104,653
HEAT EXCHANGER CONSTRUCTION
Filed June 18, 1959 4 Sheets-Sheet 4
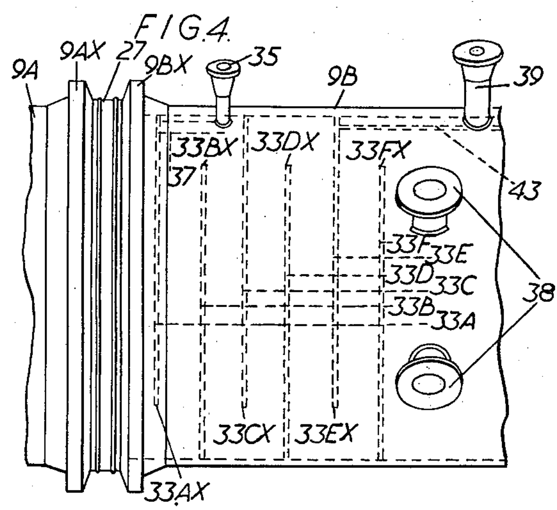
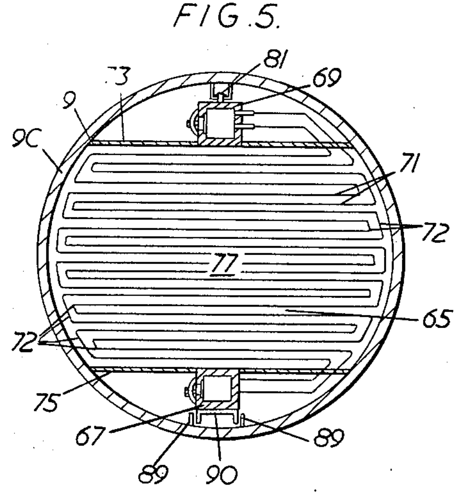
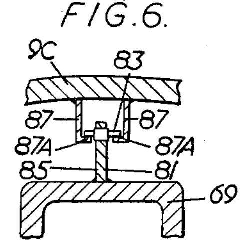
Inventor
Anthony J. Taylor
By [signature]
Attorney United States Patent Office 3,104,653
Patented Sept. 24, 1963

1

3,104,653

HEAT EXCHANGER CONSTRUCTION

Anthony J. Taylor, London, England, assignor to Babcock & Wilcox Limited, London, England, a British company Filed June 18, 1959, Ser. No. 821,173
Claims priority, application Great Britain June 26, 1958
3 Claims. (Cl. 122—32)

This invention relates to heat exchangers, and more particularly to boilers for nuclear power plants and nuclear power plants incorporating such boilers. In known nuclear power plants of the kind having a reactor with a core utilising a solid moderator and arranged to be gas-cooled, the boilers have been in the form of vertical elongated cylindrical pressure vessels affording passages for coolant under pressure and containing economiser, vapour generating and superheating heat exchange surfaces comprising tube lengths extending transversely of the passages. In order to ensure adequate circulation through the sinuous tubes constituting the vapour generating sections, circulating pumps have been used.

In a nuclear reactor power plant, reduction in power consumed by circulating fans and pumps or any provision whereby the output of the plant may be increased or its capital cost reduced is highly desirable and of great importance. Moreover, in mobile power plant such as plant for ship propulsion, compactness and lightness are matters of importance and the use of vertically elongated cylindrical pressure vessels for the boilers is inconvenient.

In order to obtain a heat exchanger which is light and compact for a given heat exchange duty, it is important to obtain a good coefficient of heat transfer first from the coolant gas to the metal wall separating the gas from the working medium of the boiler, and secondly from the metal wall to the working medium. Where the working medium is in the form of water or in the form of steam, a relatively high velocity of flow of the working medium over the metal wall is necessary. On the other hand, when the working medium is undergoing vapourisation, the boiling film coefficient of heat transfer at the metal wall is substantially independent of velocity of flow of water over the metal wall. Since the power needed to maintain a flow of water or steam over the metal wall increases considerably with its velocity, it is possible to economise in power by careful selection of the flow velocities over the metal wall in different parts of the boiler.

According to the present invention, in a boiler, suitable for a nuclear power plant, adapted to be heated by hot gases under substantial pressure, the heat exchange surfaces of the boiler being disposed within pressure vessel means, a vapour generating section of the boiler is formed by tubes arranged for flow of heating gases through the tubes and at least one other section of the boiler of tubulous form is arranged to operate with cross flow of the heating gases in relation to its tubes.

The invention will now be described, by way of example, with reference to the accompanying largely diagrammatic drawings, in which:

FIGURE 3 is a sectional side elevation taken on the line III—III of FIGURE 2 and as viewed in the direction indicated by the arrows;

FIGURE 4 is a plan view of a short part of the length of a heat exchanger shown in FIGURE 1;

2

FIGURE 5 is a transverse sectional view taken on the line V—V of FIGURE 3 and as viewed in the direction indicated by the arrows; and FIGURE 6 is a fragmentary view of an upper part of FIGURE 5, drawn to a larger scale than that figure.

Figure 1:
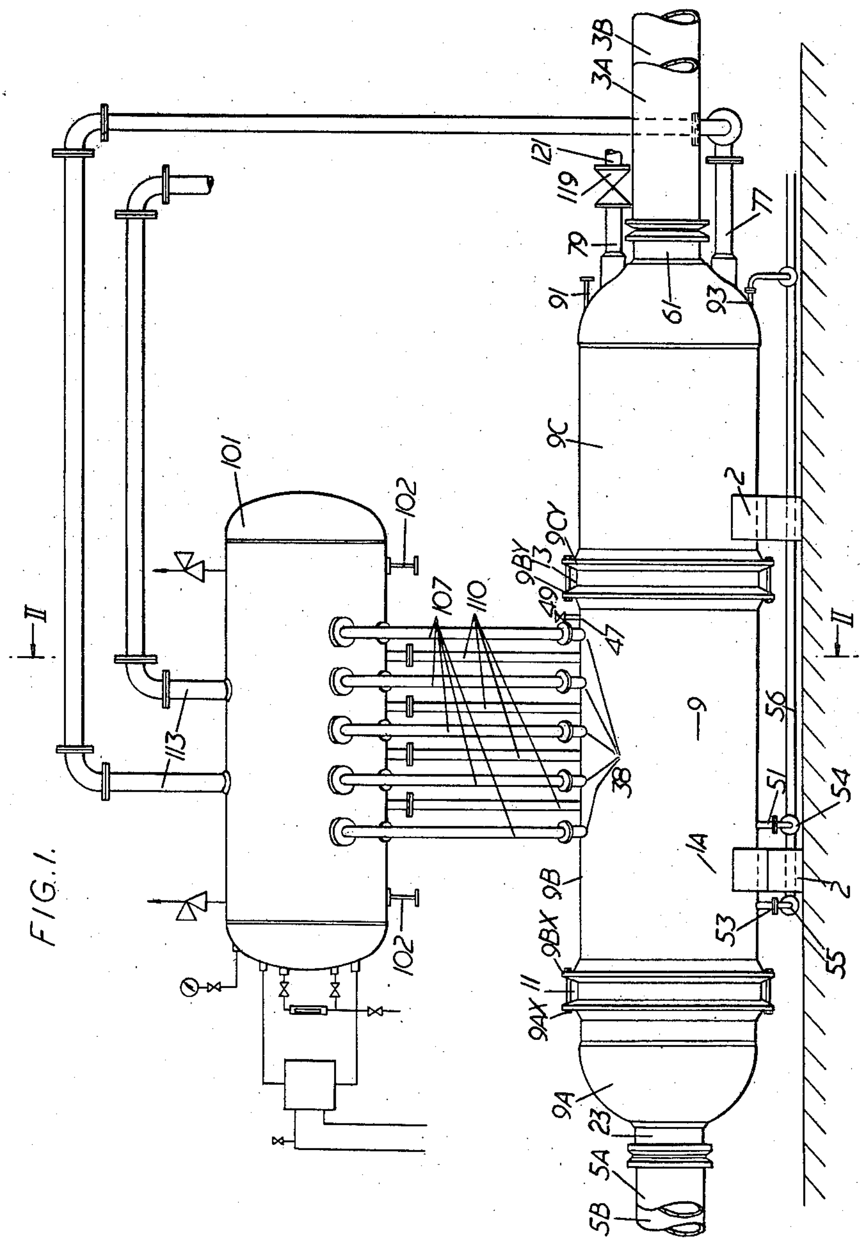
FIGURE 1 is a side elevation of a steam boiler for a marine nuclear power plant.
Figure 2:
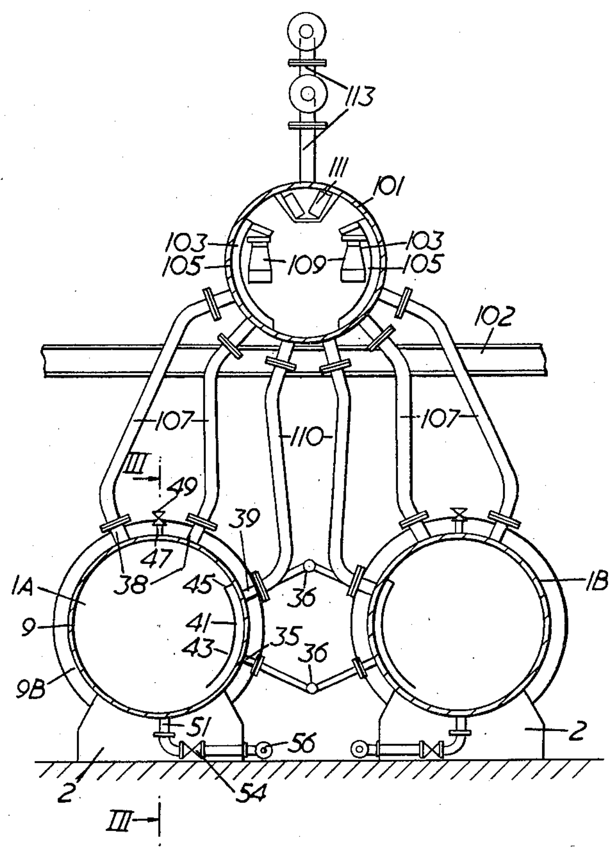
FIGURE 2 is a transverse sectional view taken on the line II—II of FIGURE 1 and as viewed in the direction indicated by the arrows.

The steam boiler shown in FIGURES 1 and 2 is adapted for operation with a ship-borne nuclear reactor of the gas cooled, graphite moderated type in which the gaseous coolant is carbon dioxide at a substantial pressure of the order of 300 pounds per square inch. A coolant circulating fan, not shown, drives the coolant gas through a closed circuit including two parallel-connected heat exchanger units 1A and 1B, each supported on two spaced cradles 2 suitably mounted on the ship's structure. Gas passes to these two units respectively through supply ducts 3A and 3B and is withdrawn from them respectively through exhaust ducts 5A and 5B. The two units 1A, 1B are similar to one another and the following description, which applies to the unit 1A, also applies to the unit 1B.

As shown most clearly in FIGURE 3, heat exchanger unit 1A includes an elongated cylindrical pressure vessel 9 consisting of three demountable sections 9A, 9B and 9C each built up from suitably curved plates welded together, the three sections being clamped together in coaxial arrangement by bolts passing through flanges provided on the sections. Thus bolts 11 passing through flanges 9AX on section 9A and 9BX on section 9B clamp those sections together, while bolts 13 passing through flanges 9BY on section 9B and 9CY on section 9C clamp those sections together. The joints between the pairs of sections are rendered fluid tight by circumferential seal welds 15 and 17 respectively.

End section 9A includes a hemispherical end part through which extends a coaxially arranged outlet duct 23 which is bolted to the exhaust duct 5A and, internally of the end part, is flared at 23A to provide a streamline flow of gases from the interior of the pressure vessel into the duct 5A.

The central section 9B is provided at the end adjacent section 9A with a tube plate 27 and at the opposite end with a tube plate 28 each of which butts against the adjacent end of the section but includes a shallow boss fitting within the section 9B and serving to centralise the tube plate on the section. Circumferential seal welds 29 and 30 connect respectively tube plates 27 and 28 to the cylindrical part of section 9B. The tube plates 27, 28 are formed with tube holes into which are expanded the ends of a large number of thin walled tubes of small diameter, too small to show individually in the drawings. There are, for example, 5650 of these tubes, each of ½ inch outside diameter and with a wall thickness of 10 S.W.G. (0.128 inch). Over a short part of the length of section 9B, extending from tube plate 27, are spaced six baffles 33A, 33B, 33C, 33D, 33E and 33F arranged in that order from tube plate 27. Each baffle is in the form of a major segment of a circle of sheet metal and these segments have their straight edges, indicated by the suffix X (see FIGURE 4), vertical and spaced alternately from opposite sides of the pressure vessel wall. In this manner a sinuous flow passage is formed extending for the most part transversely of the adjacent parts of the tubes from adjacent the tube plate 27 along the section 9B for about one third of its axial length. Two feedwater inlet nozzles 35, welded to the section 9B one above the other, are connected outside the pressure vessel to supply pipes 36 and inside the pressure vessel are connected by short pipes 37 to the space between tube plate 27 and the baffle 33A. Near the top of the pressure vessel section 9B are fitted ten riser nozzles 38 disposed in two lines of five nozzles spaced along the part of section 9B which lies beyond the baffle 33F. To one side of pressure vessel section 9B are provided four downcomer nozzles 39 welded to the pressure vessel wall and communicating with an internal space 41 separated from the remainder of the interior of the section 9B by an arcuate baffle 43 which is arranged coaxial with the section 9B, extends from the baffle 33F to the tube plate 28, and is connected at its upper end by a radial baffle 45 to the pressure vessel. This space 41 contains none of the tubes mentioned above. At its top the section 9B is provided with an air vent 47 provided with a closure valve 49, and drain nozzles are provided at the lowest level of the section. One drain nozzle 51 is disposed adjacent the baffle 33F on the side towards tube plate 28 and a second drain nozzle 53 is disposed between the baffles 33C and 33D. Small vent holes and small drain holes are provided through each of the baffles 33A to 33E respectively at their highest points and at their lowest points. Nozzles 51 and 53 are connected, respectively through stop valves 54 and 55, to a drainage system 56.

End section 9C includes a hemispherical end part through which extends a coaxially arranged inlet duct 61 which is bolted to the supply duct 3A and which inside the end part flares somewhat and is provided with a flaring extension 61A to provide a stream-line flow of gases into the unit 1A. The end section 9C also includes a cylindrical part welded to the end part and provided at its opposite end with the flange 9CY. A tubulous superheater 65 is located in this cylindrical part and comprises a lower inlet header 67 and an upper outlet header 69, both extending axially of the pressure vessel 9, and a large number of sinuously bent small diameter tubes 71 indicated for the most part merely as lines in FIGURE 5, and each connected at its two ends respectively to the headers 67 and 69. Each tube 71 consists for the most part of horizontally arranged straight parts which extend transversely of the pressure vessel, these parts being joined in series by return bends 72. These tube lengths are arranged as platens each built up of a pair of sinuous tubes. An upper chordal baffle 73, and a lower chordal baffle 75, both of sheet metal, extend horizontally across the pressure vessel to define a gas pass 77. Thus baffle 73 is disposed under outlet header 69, by which it is supported, and above the heat exchange part of the superheater 65, while the baffle 75 is disposed above the inlet header 67, by which it is supported, and below that heat exchange part. The ends of baffles 73 and 75 remote from the inlet duct 61 are curved, respectively upwardly and downwardly as indicated at 73A and 75A, to meet the pressure vessel wall. Steam pipes 77 and 79 extend respectively from the headers 67 and 69 through the hemispherical end part of the section 9C, and where they pass through that end part are anchored, so that upon differential thermal expansion of the headers and the section 9C of the pressure vessel, the superheater 65 with its headers 67, 69 and the baffles 73, 75 moves axially of the section 9C. The upper header 69 is supported from above (see FIGURE 6) by three roller supports 81 each consisting of a roller 83 journalled in a metal lug 85 welded to the upper surface of the header, the roller bearing upon the upper surfaces of inwardly directed horizontal limbs 87A of L members 87 themselves welded to the inside of the pressure vessel. The lower header 67 is provided with three pairs of wheels 89 mounted in pairs on U-shaped brackets 90 spaced along and welded to the bottom of header 67, and running upon the inner surface of the pressure vessel. An air vent pipe 91 extends from the top of upper header 69 upwardly and outwardly through the pressure vessel wall, while a drain pipe 93 extends from the bottom of lower header 67 downwardly and outwardly through that wall, both of these pipes being fitted with suitable valve means, not shown, and pipe 93 being connected to the drainage system 56.

A cylindrical steam and water drum 101 is disposed above the two units 1A and 1B with its axis parallel to and midway between their axes and is supported on cross beams 102. Inside this drum, at each side, is provided an arcuate baffle 103 which assists in defining a pocket 105 in the drum arranged to receive a steam and water mixture from pipes 107 connected at their lower ends to the riser nozzles 38 of the unit 1A or 1B to that side of the drum. A number of cyclone separators 109 are arranged to receive the steam and water mixture from that pocket, to separate the steam from the water, and to discharge the water downwardly into a central water space of the drum and the steam upwardly into a steam space. Downcomer tubes 110 connect this water space with the downcomer nozzles 39 on the unit 1A and those on unit 1B. A steam scrubber 111 is located in this steam space and is arranged to separate moisture from, and to clean, steam passing from the steam space into two steam conduits 113 spaced apart along the length of the drum and connected respectively to the steam pipe 77 of the unit 1A and to the equivalent steam pipe of the unit 1B. The drum 101 is provided, in the normal manner for steam boilers, with safety valves, pressure gauge, water level gauge, and control means for regulating the supply of feed water to maintain the water level in the drum substantially constant. This feed water is supplied in equal quantities to the feed water inlet nozzles 35 provided on the unit 1A and to similar feed water inlet nozzles provided on the unit 1B, through the supply pipes 36.

The steam pipe 79 leading from the superheater outlet header 69 is connected to a stop valve 119 from which a pipe 121 leads to a steam main. In a similar manner the outlet header of the superheater associated with the unit 1B is also connected through a stop valve to that steam main. A steam turbine of the nuclear power plant receives superheated steam from the steam main.

During operation of the marine nuclear power plant and the steam boiler described above, the carbon dioxide gaseous coolant is driven round the closed coolant circuit by the circulating fan, and the nuclear reactor is then rendered critical. Heat developed in the core of the nuclear reactor is absorbed by the gaseous coolant and the heated coolant heats and vapourises water and superheats steam in the units 1A and 1B. In those units the heated coolant passes first transversely over the superheater tubes 71, then passes through the tubes in the pressure vessel section 9B.

Water is fed continuously through the feed water inlet nozzles of both of the units 1A and 1B. In unit 1A, for example, the feed water passes from nozzles 35 through the pipes 37 into the space between tube plate 27 and the baffle 33A, in which space it passes horizontally across the parts of the tubes which lie in that space, turning to pass round the baffle edge 33AX and then returning horizontally across the parts of the tubes which lie in the space between the baffles 33A and 33B. This to-and-fro flow across the tubes is continued as the feed water passes between the baffles 33B, 33C, 33D, 33E and 33F until the feed water escapes into the steam generating section of the boiler unit, namely that part which lies between the baffle 33F and the tube plate 28. In the steam generating section, water passes upwardly through the spaces between the tubes, absorbing heat and forming and entraining bubbles of steam. The steam water mixture so formed passes out through the nozzles 38 and flows upwardly through the pipes 107 into the associated pocket 105 in the drum 101. From the pocket 105 the steam-water mixture flows into the cyclone separators 109, from which the water is discharged downwardly into a lower part of the drum and the steam is discharged upwardly into an upper steam space of drum 101. The water collected in the lower part of drum 101 flows downwardly through downcomer tubes 110 into the space 41 in the unit 1A, flows downwardly through that space into the lower part of the pressure vessel, and then joins the feed water in flowing upwardly over the steam generating parts of the tubes in the section 9B. The steam flows from the steam space of drum 101 through the scrubber 111 into the steam conduits 113 and thus to the lower inlet superheater headers such as header 67. The steam flows from the header 67 through the superheater tubes 71 to the upper outlet header 69, and thence through steam pipe 79 to the steam main. The water and steam flows in the unit 1B are similar to the flows described above with reference to the unit 1A, and steam from unit 1B joins steam from the unit 1A in the steam main.

It will be seen that, in the superheaters, the coolant flows transversely over tubulous heat exchange surfaces while in the tubes in the section 9B the coolant flow is longitudinally of those tubes. It will also be seen that water flow both in the economiser section, formed by those parts of the tubes in section 9B which lie between baffle 33F and the tube plate 27, and in the vapour generating part of the unit 1A, is transversely of the tubes. Furthermore, the velocity of water flow over the tubes in the economiser section is determined by the rate of supply of feed water and thus by the rate at which steam is being withdrawn from the boiler. In the vapour generating section of each unit 1A and 1B the water flow is upwards, and the power needed to maintain an adequate flow of that water is supplied by thermosyphonic action as a mixture of water and steam passes up the pipes 107 and water containing substantially no steam bubbles, and therefore of greater density, passes down the downcomer tubes 110.

Furthermore, for a given pressure drop in the coolant gases between the inlet and outlet ends of the boiler units, it is possible to provide more total heating surface and thereby a larger output of steam by the use of longitudinal flow of coolant gas through the tubes in the steam generating section than if all the tubulous heat exchange surfaces in the boiler operated with a cross or transverse external flow of the coolant gas.

I claim:

1. A vapor generator comprising a cylindrical pressure vessel having a heating fluid inlet in one end and a heating fluid outlet at its opposite end, means dividing said pressure vessel into a vapor generating section occupying the entire transverse cross sectional area of said vessel and a vapor superheating section, a set of heat exchange tubes extending longitudinally of said vessel in said vapor generating section, a set of superheating tubes disposed in said superheating section intermediate said vapor generating section and said heating fluid inlet, means connecting said vapor superheating tubes for serial flow of fluid from said vapor generating section, means for passing a heating fluid through said inlet to said outlet while passing over said superheater tubes in cross-flow indirect heat transfer relation with the fluid therein and then in parallel flow through the tubes in said vapor generating section, means for introducing a vaporizable liquid into said vapor generating section and effecting flow of said liquid over said tubes in indirect heat transfer relation with the heating fluid passing therethrough, and means including a baffle in said vapor generating section adjacent said heating fluid outlet arranged as an economizer section to direct said vaporizable liquid entering said vapor generating section across said tubes therein.

2. A vapor generator comprising an elongated pressure vessel, means dividing said pressure vessel into a plurality of sections including a vapor generating section, a set of heat exchange tubes disposed in said vapor generating section arranged for passage of a heating fluid therethrough, means for introducing a vaporizable liquid into said vapor generating section, an outlet in the upper portion of said vapor generating section, and a second section of said pressure vessel having inlet and outlet headers disposed therein and extending longitudinally of said pressure vessel, a plurality of sinuous heat exchange tubes extending between said inlet and outlet headers, means connecting each of said headers to said pressure vessel while permitting differential movement therebetween, said last named means comprising means for anchoring one end of said headers to the end portion of said pressure vessel and means for supporting the remaining portion of each of said headers from said pressure vessel for differential movement therebetween, means for passing generated vapor through said sinuous heat exchange tubes, means supplying said heating fluid to said second section and effecting a cross-flow over said sinuous heat exchange tubes, and means directing said heating fluid from said second section into said first named set of heat exchange tubes.

3. A vapor generator comprising a cylindrical pressure vessel having a heating fluid inlet in one end and a heating fluid outlet at its opposite end, means dividing said pressure vessel into a vapor generating section occupying the entire transverse cross sectional area of said vessel and a vapor superheating section, a set of heat exchange tubes extending longitudinally of said vessel in said vapor generating section, inlet and outlet headers disposed in said superheating section intermediate said vapor generating section and said heating fluid inlet and extending longitudinally of said pressure vessel, a plurality of sinuous heat exchange tubes extending between said inlet and outlet headers, means connecting each of said headers to said pressure vessel while permitting differential movement therebetween, said last named meanes comprising means for anchoring one end of said headers to the end portion of said pressure vessel and means for supporting the remaining portion of each of said headers from said pressure vessel for differential movement therebetween, means connecting said vapor superheating tubes for serial flow of fluid from said vapor generating section, means for passing a heating fluid through said inlet to said outlet while passing over said superheater tubes in cross-flow indirect heat transfer relation with the fluid therein and then in parallel flow through the tubes in said vapor generating section, means for introducing a vaporizable liquid into said vapor generating section and effecting flow of said liquid over said tubes in indirect heat transfer relation with the heating fluid passing therethrough, and means including a baffle in said vapor generating section adjacent said heating fluid outlet arranged as an economizer section to direct said vaporizable liquid entering said vapor generating section across said tubes therein.

References Cited in the file of this patent

UNITED STATES PATENTS

| | | |
|---|---|---|
| 1,392,080 | Ross | Sept. 27, 1921 |
| 1,881,815 | Mehler et al. | Oct. 11, 1932 |
| 2,555,043 | Lewis | May 29, 1951 |
| 2,580,033 | Loweth et al. | Dec. 25, 1951 |
| 2,796,050 | Rehm | June 18, 1957 |
| 2,904,013 | Davies et al. | Sept. 15, 1959 |

FOREIGN PATENTS

| | | |
|---|---|---|
| 1,157,405 | France | Dec. 30, 1957 |